W. BRAJDOVICS.
AUTOMOBILE WHEEL.
APPLICATION FILED NOV. 2, 1918.

1,294,386.

Patented Feb. 18, 1919.
2 SHEETS—SHEET 2.

Inventor
W. Brajdovics

By A. M. Wilson
Attorney

UNITED STATES PATENT OFFICE.

WILLIAM BRAJDOVIČS, OF SHARPSVILLE, PENNSYLVANIA.

AUTOMOBILE-WHEEL.

1,294,386.   Specification of Letters Patent.   Patented Feb. 18, 1919.

Application filed November 2, 1918. Serial No. 260,854.

*To all whom it may concern:*

Be it known that I, WILLIAM BRAJDOVIČS, a Czecho-Slovak, claimed as a subject of the King of Hungary, having declared my intention to become a citizen of the United States, residing at Sharpsville, in the county of Mercer and State of Pennsylvania, have invented certain new and useful Improvements in Automobile-Wheels, of which the following is a specification.

The primary object of the invention is the provision of a resilient wheel especially adapted for automobiles, trucks and similar vehicles which possesses great strength and is capable of absorbing the shocks and jars incident to travel over rough roads, the structure being easy and inexpensive to manufacture.

A further object of the invention is the provision of means for resiliently mounting the hub of a vehicle for rendering the same easy riding for both passengers and articles to be transported, provision being made for regulating the resiliency of shock absorbing members forming a part of the device.

With these general objects in view, the invention consists of the novel combination and arrangement of parts herein described in connection with the accompanying drawings in which like reference characters designate corresponding parts throughout the several views.

In the drawings,

Figure 1 is a side elevation of the complete wheel.

Figs. 2, 3, and 4 are enlarged sectional views taken upon lines II—II, III—III, and IV—IV respectively, of Fig. 1.

Figure 1:
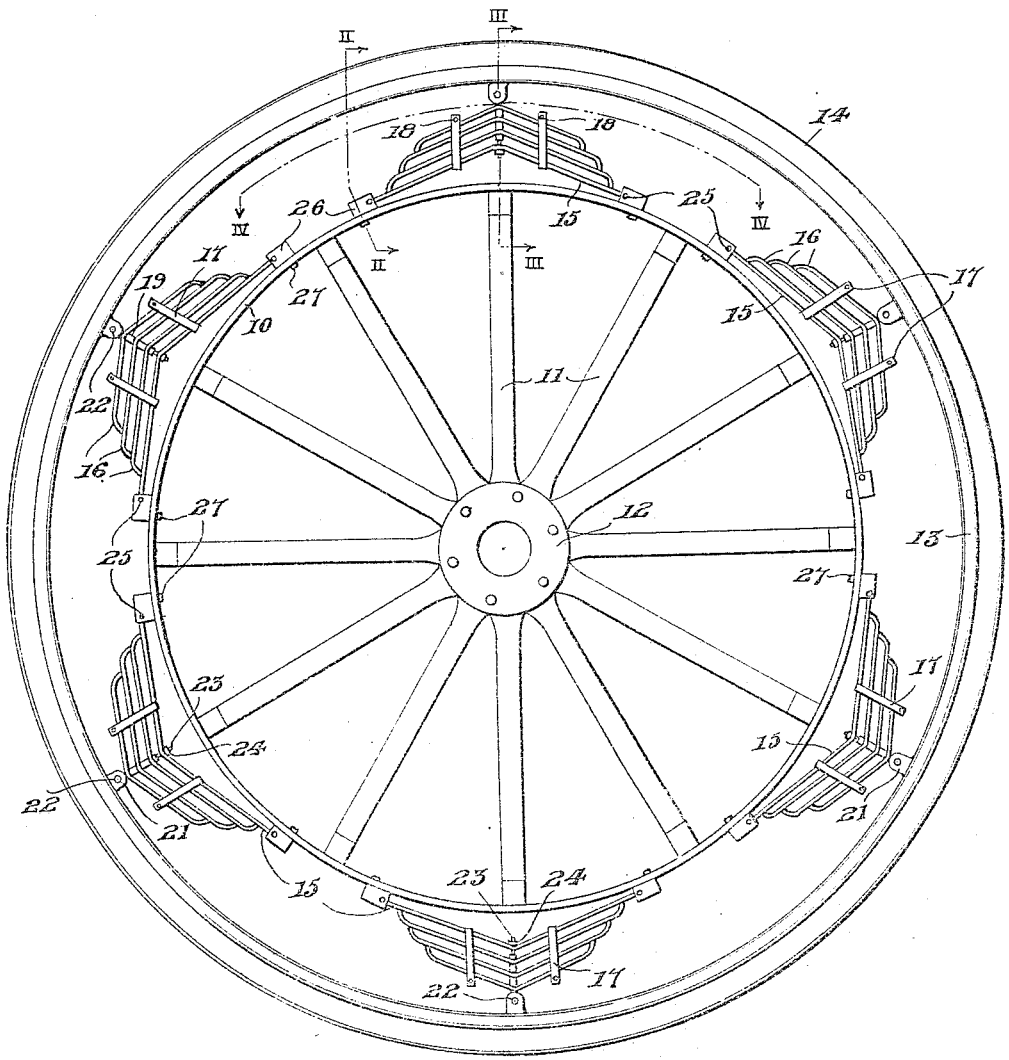
Figure 2:
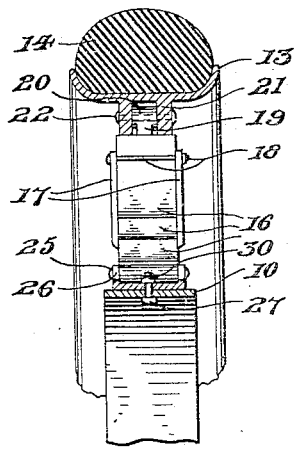
Figure 3:
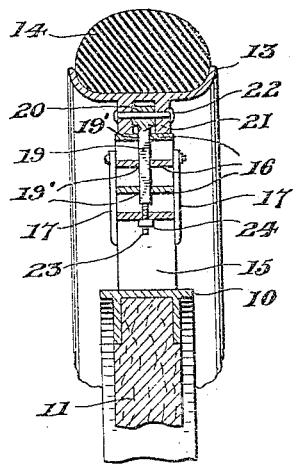
Figure 4:
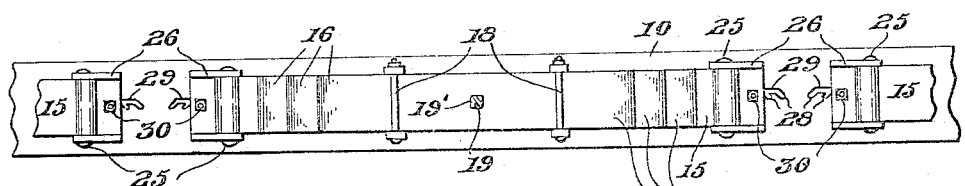
Figure 5:
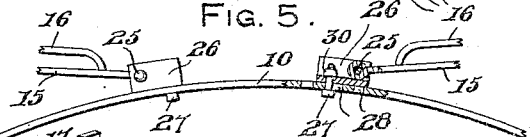
Fig. 5 is an enlarged side elevation of a portion thereof with parts broken away.
Figure 6:
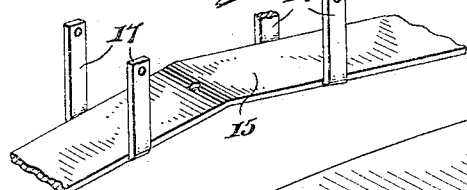
Fig. 6 is a perspective view of a portion of one of the spring members.
Figure 7:
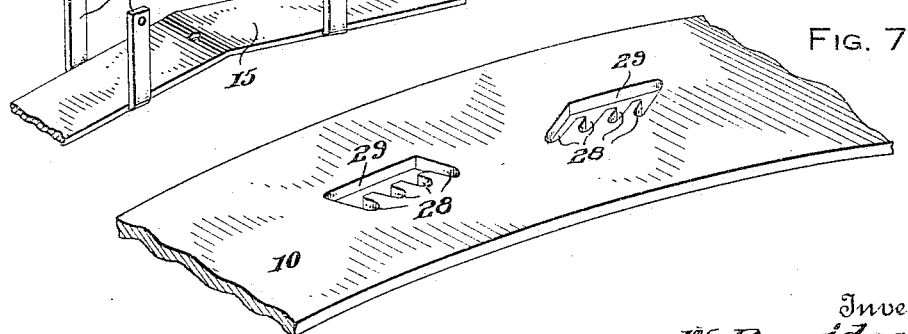
Fig. 7 is a similar view of a portion of the inner rim employed.

My invention broadly consists in resiliently connecting together the inner rim 10 having spokes 11 and a hub 12 with an outer rim or felly 13 having a ground engaging tire 14 peripherally mounted thereon.

The connections between the rim 10 and felly 13 being resilient, acting after the manner of shock absorbers herein illustrated in Fig. 1 as being six in number. Each of the shock absorbers comprises a main leaf spring 15, substantially V-shaped, with a plurality of correspondingly shaped leaves 16 decreasing in length mounted thereon outwardly thereof. Opposite outwardly projecting guards 17 are carried by the inner leaf 15 at its opposite sides and within which the leaves 16 are positioned, while bolts 18 connecting the guards 17 together adjacent their outer free ends limit the movement of the spring.

A squared bolt 19 slidably extends centrally through the leaves 16 with its outer end 20 in the form of a head retained between inwardly extending lugs 21 of the felly 13 by means of a rivet 22. The bolt 19 has an inner threaded end 23 centrally projecting through the main leaf 15 of the shock absorber while a nut 24 is mounted upon said portion 23 for retaining the leaves upon the bolt 19.

The outer ends of the leaf 15 are pivoted as at 25 to blocks 26 which are adjustably mounted upon the outer periphery of the rim 10 by holdfast means such as bolts 27 passing through the blocks 26 and secured within one of the slots 28 in the rim 10. The rim 10 is provided with suitably spaced longitudinally extending slots 29, each having a plurality of radially extending slots 28 heretofore referred to and in which lateral slots, the bolts 27 of each shock absorbing spring 15 is secured by means of the lock nuts 30 upon the bolts 27.

The blocks 26 are preferably U-shaped for better positioning the free ends of the springs 15 pivotally therein. By this arrangement, it will be seen that the springs 15 may be bent or tensioned at the desired angle and the blocks 26 thereof then secured to the rim 10, it being understood that the springs 15 as well as the leaves 16 normally tend to bend centrally a greater degree with their free ends approaching each other in V-shaped form. The weight of the hub 12 of the wheel is both suspended and supported by the shock absorbers formed in the manner noted and an easy riding structure is thereby provided, it being seen that the guards 17 and their bolts 18 hold the separate leaves from spreading laterally and separating, which is also assisted by the squared bolt 19 passing through the squared openings 19' in the spring leaves 16.

What I claim as new is:—

1. A device of the class described comprising a wheel having a rim, a felly positioned outwardly of the rim, V-shaped main springs having their opposite ends adjustably secured to the outer side of said rim, a plurality of V-shaped spring leaves mounted outwardly upon said spring and a bolt centrally extending through said main spring and leaves pivotally connected to the inner side of said felly.

2. In combination with a wheel having a rim, a tire receiving felly positioned outwardly thereof, a plurality of V-shaped springs mounted upon each other between said rim and felly decreasing in length toward the felly, retaining guards for said springs, mounting blocks for the innermost springs adjustably secured to said rim, bolts shiftably positioned centrally through said springs pivotally connected to the inner face of the felly and adjusting means upon the inner end of said bolts.

3. A spring wheel including a rim having spaced longitudinal slots provided with radial side slots, a felly outwardly of said rim, pairs of inwardly projecting lugs upon the inner face of the felly centrally between each pair of slots of the rim, a block for each slot of the rim, a securing bolt for each block adjustably positioned through said side slots of the rim, a V-shaped main spring for each pair of blocks having its free ends pivoted within said blocks, gradually decreasing V-shaped spring leaves mounted outwardly upon said main spring and connections between said main spring and leaves and the said felly.

4. A spring wheel including a rim having spaced longitudinal slots provided with radial side slots, a felly outwardly of said rim, pairs of inwardly projecting lugs upon the inner face of the felly centrally between each pair of slots of the rim, a block for each slot of the rim, a securing bolt for each block adjustably positioned through said side slots of the rim, a V-shaped main spring for each pair of blocks having its free ends pivoted within said blocks, V-shaped leaves of decreasing length having their ends engaging with each other mounted outwardly upon each of said main springs, outwardly projecting guards carried by each main spring at the sides of said leaves, cross bolts at the free ends of said guards overlying the outermost ones of said leaves and adjustable connections between said felly and the spring and leaves.

5. A spring wheel including a rim having spaced longitudinal slots provided with radial side slots, a felly outwardly of said rim, pairs of inwardly projecting lugs upon the inner face of the felly centrally between each pair of slots of the rim, a block for each slot of the rim, a securing bolt for each block adjustably positioned through said side slots of the rim, a V-shaped main spring for each pair of blocks having its free ends pivoted within said blocks, V-shaped leaves of decreasing length having their ends engaging with each other mounted outwardly upon each of said main springs, outwardly projecting guards carried by each main spring at the sides of said leaves, cross bolts at the free ends of said guards overlying the outermost ones of said leaves, adjustable connections between said felly and the spring and leaves, pairs of inwardly projecting lugs upon the felly, squared bolts slidably positioned centrally through said leaves having a threaded inner portion projecting through said main springs, an adjusting nut upon the threaded portion of each of said squared bolts inwardly of said main springs and a head upon the outer end of each squared bolt pivoted between the adjacently positioned pair of lugs.

In testimony whereof I affix my signature.

WILLIAM BRAJDOVIČS.

Copies of this patent may be obtained for five cents each, by addressing the "Commissioner of Patents, Washington, D. C."